United States Patent
Walton

(10) Patent No.: US 10,318,152 B2
(45) Date of Patent: *Jun. 11, 2019

(54) MODIFYING KEY SIZE ON A TOUCH SCREEN BASED ON FINGERTIP LOCATION

(71) Applicant: INTERNATIONAL BUSINESS MACHINES CORPORATION, Armonk, NY (US)

(72) Inventor: Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,757

(22) Filed: Jun. 14, 2018

(65) Prior Publication Data

US 2018/0292987 A1    Oct. 11, 2018

Related U.S. Application Data

(63) Continuation of application No. 15/632,848, filed on Jun. 26, 2017, now Pat. No. 10,019,157, which is a continuation of application No. 13/783,493, filed on Mar. 4, 2013, now Pat. No. 9,747,025.

(51) Int. Cl.
  *G06F 3/0489* (2013.01)
  *G06F 3/0488* (2013.01)
  *G06F 3/0484* (2013.01)

(52) U.S. Cl.
  CPC ...... *G06F 3/04895* (2013.01); *G06F 3/04842* (2013.01); *G06F 3/04886* (2013.01); *G06F 2203/04806* (2013.01)

(58) Field of Classification Search
  CPC ............. G06F 3/04895; G06F 3/04886; G06F 2203/04805; G06F 2203/04806
  See application file for complete search history.

(56) References Cited

U.S. PATENT DOCUMENTS

| | | |
|---|---|---|
| 7,653,883 B2 | 2/2010 | Hotelling et al. |
| 8,239,784 B2 | 8/2012 | Hotelling et al. |
| 8,289,286 B2 | 10/2012 | Stallings et al. |
| 8,381,118 B2 | 2/2013 | Minton |
| 8,471,825 B2 | 6/2013 | Miyazaki |
| 8,704,791 B2 | 4/2014 | Soo et al. |

(Continued)

OTHER PUBLICATIONS

Advisory Action (dated May 21, 2015) for U.S. Appl. No. 13/783,493, filed Mar. 4, 2013; Confirmation No. 5038.

(Continued)

*Primary Examiner* — Sardis F Azongha
(74) *Attorney, Agent, or Firm* — Schmeiser, Olsen & Watts; William H. Hartwell

(57) ABSTRACT

An approach for modifying a size of a key on a keyboard displayed on a touch screen is presented. Based on a fingertip of a user being aligned with the key at a first proximity, the key is enlarged, key(s) originally on a periphery of the keyboard are moved, and the key(s) are removed from view on the touch screen. After enlarging the size of the key, keys other than the key(s) retain their sizes, each of the keys whose size is retained is moved towards a corresponding edge of the touch screen. After the key(s) originally on the periphery are removed, the keyboard is displayed to include the moved, originally-sized keys and the enlarged key and not include the removed key(s), and cover a surface area equal to an original surface area of the keyboard.

15 Claims, 8 Drawing Sheets

(56) References Cited

U.S. PATENT DOCUMENTS

| | | |
|---|---|---|
| 9,747,025 B2 | 8/2017 | Walton |
| 2006/0026521 A1 | 2/2006 | Hotelling et al. |
| 2008/0096610 A1 | 4/2008 | Shin et al. |
| 2010/0265181 A1 | 10/2010 | Shore |
| 2012/0240069 A1 | 9/2012 | Kawalkar |
| 2014/0247218 A1 | 9/2014 | Walton |
| 2017/0293424 A1 | 10/2017 | Walton |

OTHER PUBLICATIONS

Amendment and RCE filed Jun. 9, 2015 in response to Advisory Action (dated May 21, 2015) for U.S. Appl. No. 13/783,493, filed Mar. 4, 2013; Confirmation No. 5038.
Amendment filed Jan. 22, 2015 in response to Office Action (dated Oct. 22, 2014) for U.S. Appl. No. 13/783,493, filed Mar. 4, 2013; Confirmation No. 5038.
Amendment filed Mar. 6, 2017 in response to Office Action (dated Dec. 6, 2016) for U.S. Appl. No. 13/783,493, filed Mar. 4, 2013; Confirmation No. 5038.
Amendment filed May 11, 2015 in response to Final Office Action (dated Mar. 11, 2015) for U.S. Appl. No. 13/783,493, filed Mar. 4, 2013; Confirmation No. 5038.
Amendment filed Oct. 14, 2015 in response to Office Action (dated Jul. 16, 2015) for U.S. Appl. No. 13/783,493, filed Mar. 4, 2013; Confirmation No. 5038.
Appeal Brief filed May 12, 2016 for U.S. Appl. No. 13/783,493, filed Mar. 4, 2013; Confirmation No. 5038.
Final Office Action (dated Mar. 11, 2015) for U.S. Appl. No. 13/783,493, filed Mar. 4, 2013; Confirmation No. 5038.
Final Office Action (dated Dec. 17, 2015) for U.S. Appl. No. 13/783,493, filed Mar. 4, 2013; Confirmation No. 5038.
Notice of Allowance (dated Apr. 24, 2017) for U.S. Appl. No. 13/783,493, filed Mar. 4, 2013; Confirmation No. 5038.
Notice of Appeal filed Mar. 14, 2016 in response to Final Office Action (dated Dec. 17, 2015) for U.S. Appl. No. 13/783,493, filed Mar. 4, 2013; Confirmation No. 5038.
Office Action (dated Jul. 16, 2015) for U.S. Appl. No. 13/783,493, filed Mar. 4, 2013; Confirmation No. 5038.
Office Action (dated Oct. 22, 2014) for U.S. Appl. No. 13/783,493, filed Mar. 4, 2013; Confirmation No. 5038.
Office Action (dated Dec. 6, 2016) for U.S. Appl. No. 13/783,493, filed Mar. 4, 2013; Confirmation No. 5038.
Office Action (dated Nov. 3, 2017) for U.S. Appl. No. 15/632,848, filed Jun. 26, 2017; Confirmation No. 5137.
Amendment filed Jan. 18, 2018 in response to Office Action (dated Nov. 3, 2017) for U.S. Appl. No. 15/632,848, filed Jun. 26, 2017; Confirmation No. 5137.
Notice of Allowance (dated Mar. 8, 2018) for U.S. Appl. No. 15/632,848, filed Jun. 26, 2017; Confirmation No. 5137.

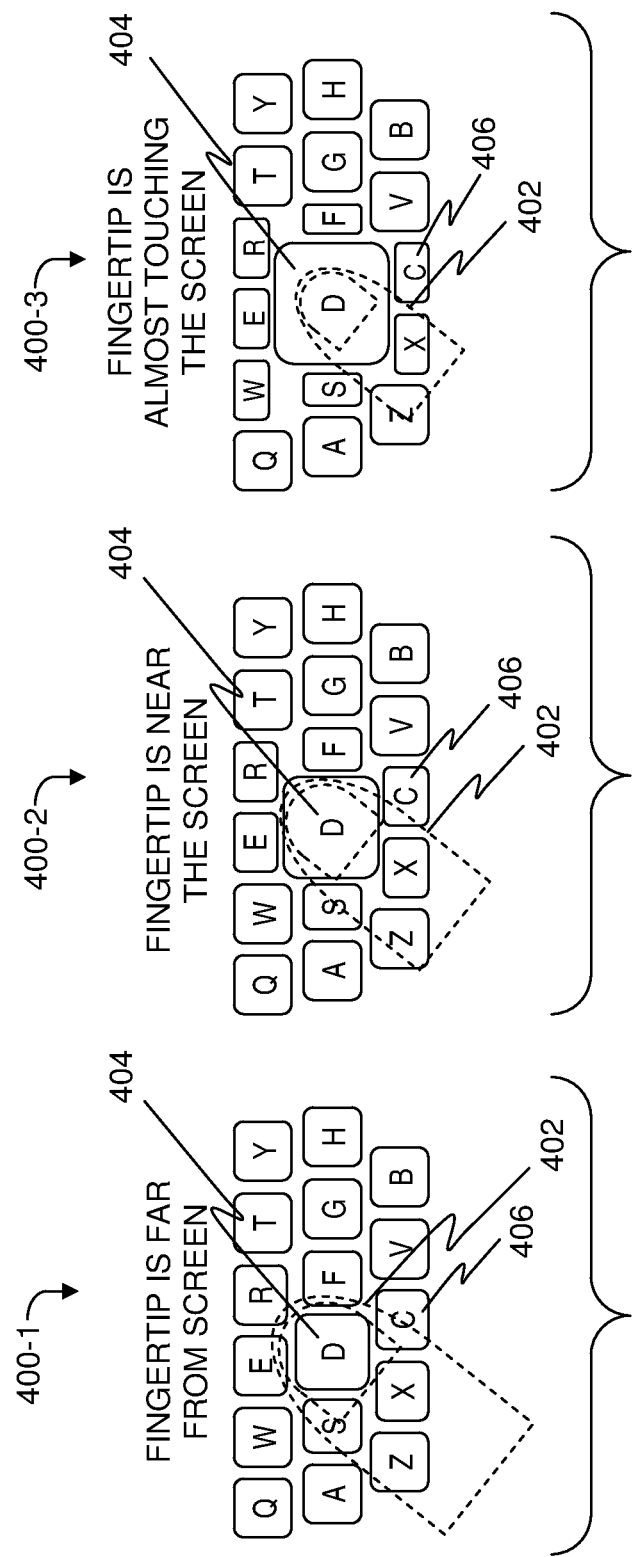

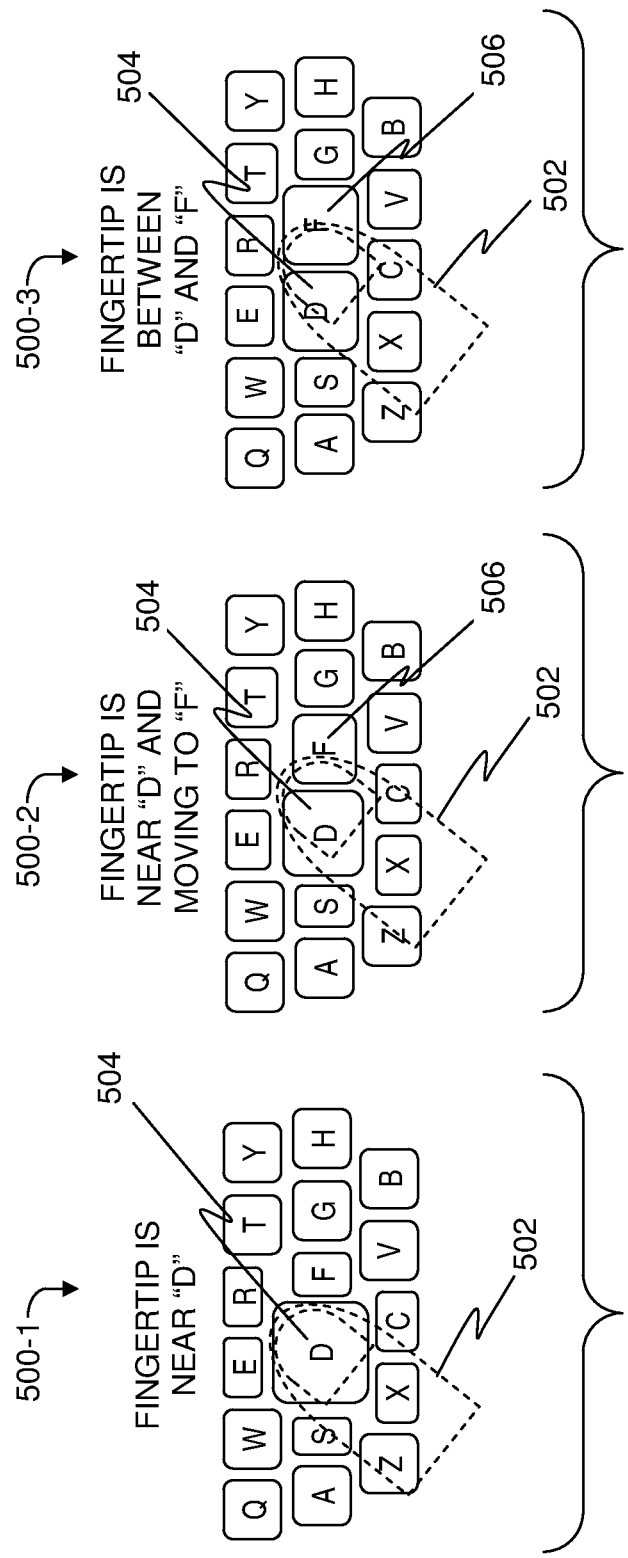

MODIFYING KEY SIZE ON A TOUCH SCREEN BASED ON FINGERTIP LOCATION

CROSS REFERENCE TO RELATED APPLICATIONS

This application is a continuation application claiming priority to Ser. No. 15/632,848 filed Jun. 26, 2017, now U.S. Pat. No. 10,019,157, issued Jul. 10, 2018, which is a continuation application claiming priority to Ser. No. 13/783,493 filed Mar. 4, 2013 now U.S. Pat. No. 9,747,025 issued Aug. 29, 2017, the contents of which are hereby incorporated by reference.

TECHNICAL FIELD

The present invention generally relates to a data processing method and system for managing display of a touch screen, and more particularly to modifying the sizes of keys displayed on a touch screen.

BACKGROUND

Keys displayed on a touch screen keyboard or other control buttons displayed on a touch screen interface are smaller than a user's fingertip, thereby making it easy for a user to unintentionally select a wrong key or other control button. To address the problem of incorrect selections on a touch screen, known techniques provide (1) a smart auto-correct feature that guesses what the user intended to type; (2) a static keyboard layout that differs from a standard layout and includes a relatively small number of keys that can be used to select the characters on a standard keyboard; and (3) a static keyboard that includes different-sized keys based on how often the keys are used. Another known technique disclosed in U.S. Pat. No. 7,653,883 facilitates control button selection by a user by enlarging a control button under the user's fingertip to a single enlargement size before the fingertip touches the control button.

BRIEF SUMMARY

An embodiment of the present invention is a system, method and program product for modifying a size of a key on a keyboard displayed on a touch screen. A fingertip of a user is determined to be aligned with the key at a first proximity from the key or touch screen, and in response, the size of the key is enlarged by a first enlargement amount. Responsive to the fingertip moving closer to the key, a second, closer proximity of the fingertip to the key or touch screen is determined and the size of the key is further enlarged by a second enlargement amount to assist the user in touching the key and avoiding touching another, adjacent key on the keyboard. Embodiments of the present invention improves keyboarding accuracy on a touch screen by providing visual feedback to allow a user to correct the course of the user's fingertip before the user commits to a selecting a character.

BRIEF DESCRIPTION OF THE DRAWINGS

FIGS. 4A-4C depict an example of a modification in a size of a key on a touch screen resulting from a fingertip moving closer to the key on a touch screen and from the process in the flowchart depicted in FIGS. 2A-2B, in accordance with embodiments of the present invention.

FIGS. 5A-5C depict an example of a modification of sizes of keys on a touch screen resulting from a fingertip moving laterally across a touch screen and from the process in the flowchart depicted in FIGS. 3A-3C, in accordance with embodiments of the present invention.

DETAILED DESCRIPTION

Overview

Embodiments of the present invention identify a key a user is about to touch on a keyboard displayed on a touch screen by utilizing a proximity of a user's fingertip to the keyboard and a position on the touch screen to which the fingertip is aligned. As the user's fingertip moves closer to the touch screen, the identified key is enlarged in a progression of enlarged sizes, thereby providing visual feedback to the user before the fingertip touches the touch screen. By gaining the visual feedback, the user is initially notified as to which key will be enlarged further as the fingertip moves closer to the key, and the further enlargements of the key subsequently assist the user in actually touching the key while avoiding an unintended touching of an adjacent key.

System for Modifying Sizes of Keys on a Touch Screen

Figure 1:
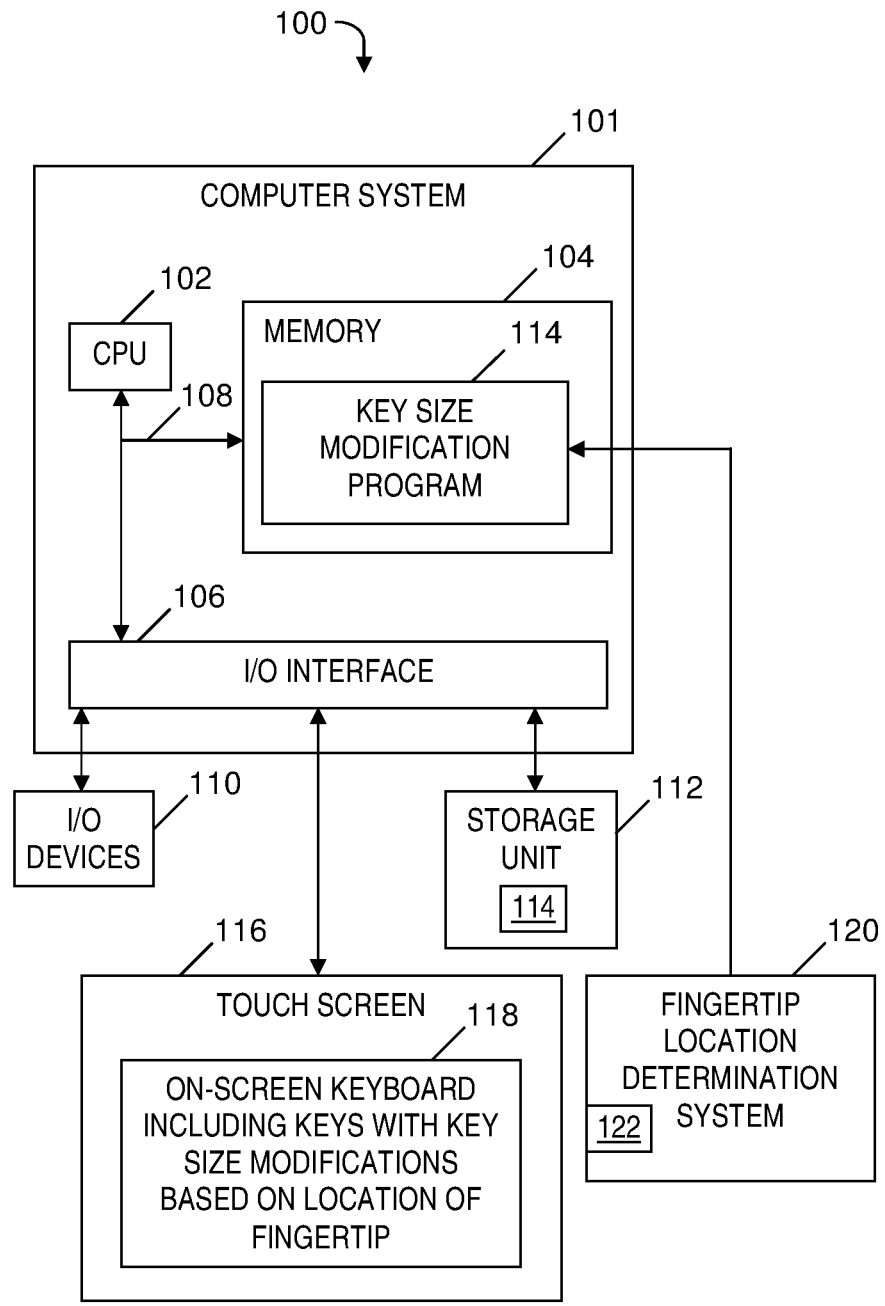
FIG. 1 is a block diagram of a system for modifying key size on a touch screen, in accordance with embodiments of the present invention.

FIG. 1 is a block diagram of a system for modifying key size on a touch screen, in accordance with embodiments of the present invention. System 100 includes a computer system 101, which generally includes a central processing unit (CPU) 102, a memory 104, an input/output (I/O) interface 106, and a bus 108. Further, computer system 101 is coupled to I/O devices 110 and a computer data storage unit 112. CPU 102 executes key size modification program 114 stored in data storage unit 112 via memory 104 to modify a size of a key on a touch screen 116. The key is included in an on-screen keyboard 118 (i.e., a software keyboard; also known as a keypad) displayed on touch screen 116. Hereinafter, on-screen keyboard 118 is also simply referred to as a keyboard. In one embodiment, keyboard 118 includes multiple keys, where the size of at least some the keys is smaller than a fingertip of a user. In one embodiment, the surface area of each of the aforementioned keys is smaller than a surface area of the portion of the fingertip that touches touch screen 116 when selecting a key. In another embodiment, the surface area of each of the aforementioned keys is smaller than the area formed by the outline of the fingertip when the fingertip is touching touch screen 116. Computer system 101, CPU 102, memory 104, I/O interface 106, bus 108, I/O devices 110, storage unit 112 and key size modification program 114 are further described in the section entitled Computer System presented below.

Touch screen 116 is coupled to computer system 101 via I/O interface 106. In another embodiment, touch screen 116 is included in computer system 101. Touch screen 116 displays an on-screen keyboard 118 (i.e., software keyboard)

including one or more keys whose sizes are modified based on a location of a user's fingertip. In one embodiment, touch screen 116 displays keyboard 118 in which one or more keys are enlarged from their original sizes and one or more keys are reduced from their original sizes. The key size modifications included in keyboard 118 are determined by the execution by CPU 102 of key size modification program 114 stored in storage unit 112 via memory 104.

In an alternate embodiment, touch screen 116 displays keyboard 118 in which key size modification program 114 enlarges one or more keys from their original sizes based on the fingertip's proximity to and alignment relative to the one or more keys. The other keys retain their original sizes, but one or more keys that are originally on the periphery of the originally displayed keyboard are moved on touch screen 116 and then removed from view on touch screen 116, so that they are no longer included in the displayed keyboard 118. Alternatively, the one or more keys originally on the periphery of keyboard 118 are removed from view on touch screen 116 without being shown to move prior to being removed. Each of the remaining keys on keyboard 118 (i.e., the keys that are not removed from view, but that retain their original sizes) are moved towards a corresponding edge of the area on touch screen 116 that includes keyboard 118, so that the remaining keys plus the enlarged key(s) cover substantially the same area that was covered by keyboard 118 prior to the enlargement of the key(s).

System 100 includes a fingertip location determination system 120 configured to determine proximities (i.e., distances) of the user's fingertip to touch screen 116, determine a central point of the user's fingertip, and determine a coordinate position (e.g., position on an (x,y) coordinate system) on at least a portion of the surface of touch screen 116 that is directly aligned with (e.g., under) the central point of the user's fingertip. As used herein, a point on the surface of touch screen 116 is aligned with a fingertip if a line joining the point of the surface of touch screen 116 to a central point of the fingertip is substantially perpendicular to the surface of touch screen 116. The aforementioned proximities of the user's fingertip to touch screen 116 and the aforementioned coordinate position that is directly aligned with (e.g., under) the central point of the user's fingertip are herein also referred to collectively as the "location of the fingertip" or the "fingertip location." Fingertip location determination system 120 determines the fingertip location when the user's fingertip is in close proximity to, but not in contact with, the surface of touch screen 116.

Fingertip location determination system 120 determines the fingertip location for the user's fingertip that is in close proximity to touch screen 116 as the fingertip (1) moves directly towards the surface of touch screen 116; (2) hovers in a location aligned with a position on touch screen 116, without touching touch screen 116 (e.g., hovers over the surface of touch screen 116); or (3) moves about in various directions while not touching (e.g., remaining above) the surface of touch screen 116. By determining the fingertip location, fingertip location determination system 120 provides inputs to computer system 101, including inputs used to modify the sizes of keys in keyboard 118.

In one embodiment, fingertip location determination system 120 employs an infrared (IR) sensing system to determine the fingertip location. The IR sensing system sends out pulses of IR light, and detects reflections of the IR light from objects that are nearby. For example, the IR light may be reflected off of a fingertip located in front of the pulsed IR light. If the IR sensing system detects reflected light, then an object is assumed to be present. If the IR sensing system does not detect reflected light, then it is determined that no object is present. In one embodiment, the IR sensing system focuses IR light to multiple, particular distances above the surface of touch screen 116, which allows the determination of a proximity of a fingertip to touch screen 116 at any of the multiple distances.

In another embodiment, fingertip location determination system 120 uses multiple optical cameras to generate multiple images of the fingertip. Using the multiple images, fingertip location determination system 120 determines the fingertip location by determining differences in the sizes of the fingertip in the multiple images and by using triangulation.

Fingertip location determination system 120 may also be based on other sensing technologies that measure and/or detect changes in capacitance, light intensity, acoustic emissions, heat, ultrasonic pulses and the like.

In one embodiment, fingertip location determination system 120 includes one or more proximity sensors 122 that generate one or more sensing fields (not shown) above the surface of touch screen 116. In conjunction with a controller (not shown), the one or more proximity sensors 122 produce signals when an object disturbs or intercepts the sensing field(s). Each sensing field generates its own signals when disturbed. In one embodiment, a single sensing field is used to cover the entire surface of touch screen 116. In another embodiment, a single sensing field only covers a portion of the surface of touch screen 116 (i.e., the portion of the surface that includes keyboard 118).

The functionality of components of system 100 is further described below in the discussion of FIGS. 2A-2B and FIGS. 3A-3C, and in the section entitled Computer System.

Processes for Modifying Sizes of Keys on a Touch Screen

Figure 2A:
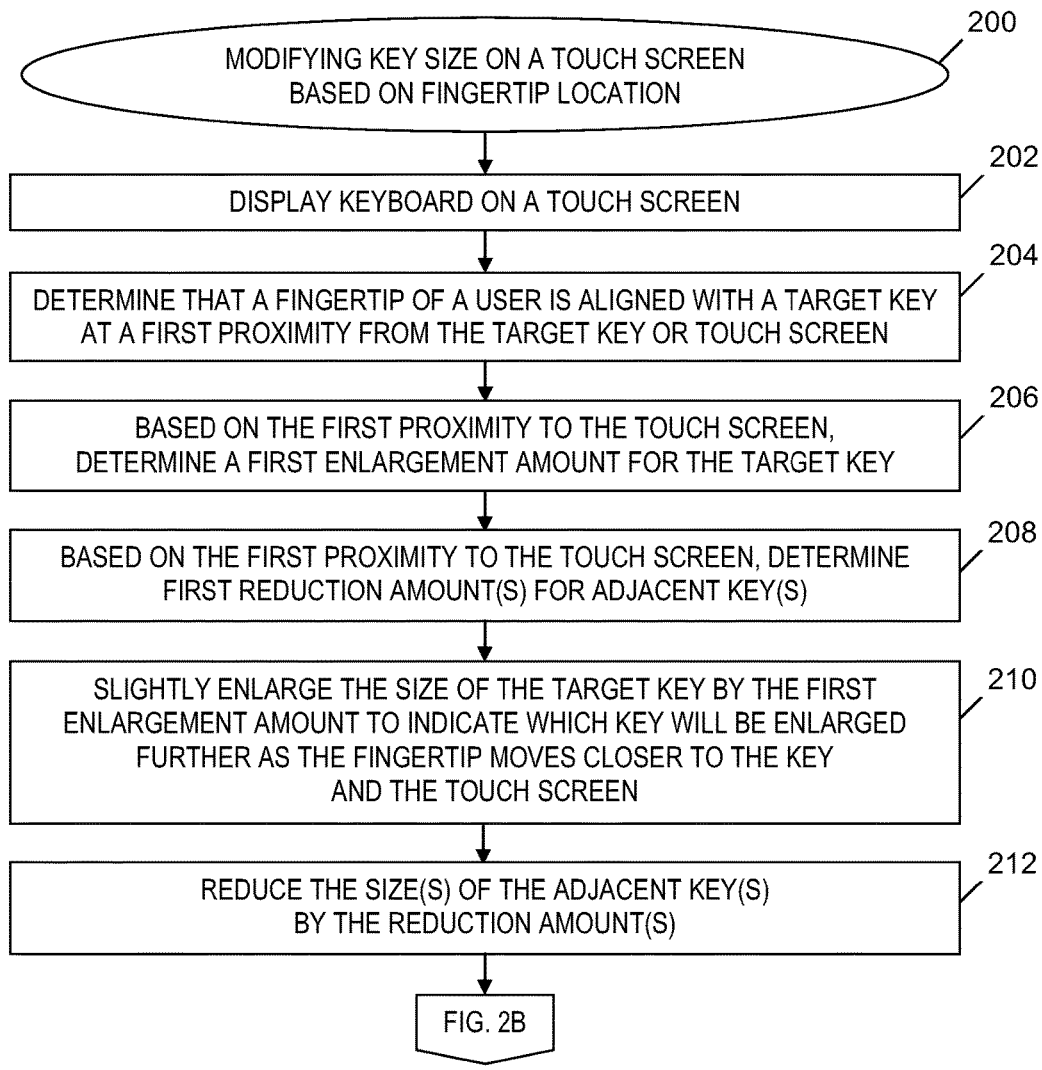
FIGS. 2A-2B depict a flowchart of a key size modification program executed in a computer system included in the system of FIG. 1 to modify a key size on a touch screen based on fingertip location, in accordance with embodiments of the present invention.
Figure 2B:
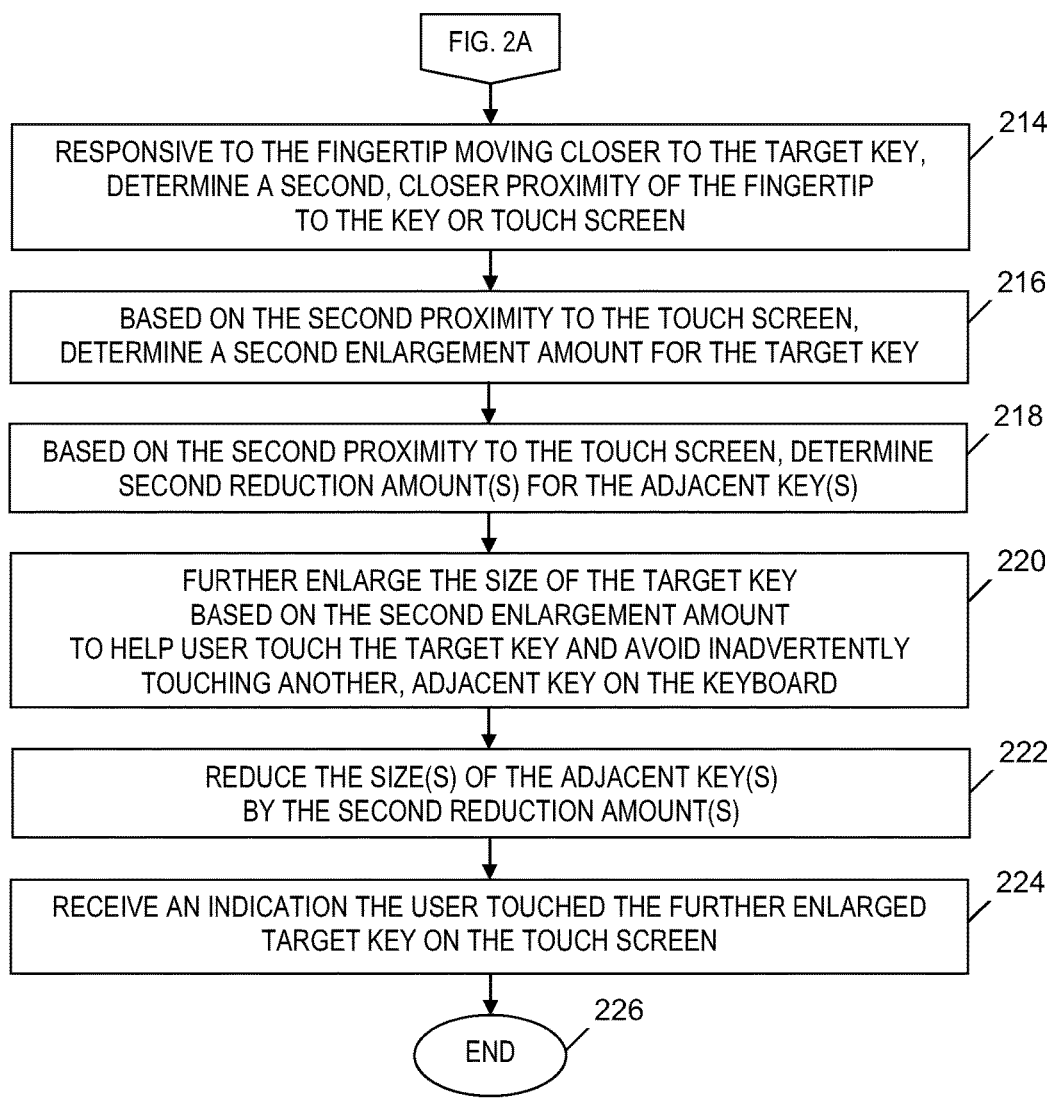

FIGS. 2A-2B depict a flowchart of a key size modification program executed in a computer system included in the system of FIG. 1 to modify a key size on a touch screen based on fingertip location, in accordance with embodiments of the present invention. The process of modifying key size on a touch screen based on fingertip location starts at step 200. In step 202, key size modification program 114 (see FIG. 1) initiates a display of keyboard 118 (see FIG. 1) on touch screen 116 (see FIG. 1).

In step 204, key size modification program 114 (see FIG. 1) determines that a fingertip of a user is aligned with a target key at a first proximity from the key or touch screen 116 (see FIG. 1). In one embodiment, step 204 includes key size modification program 114 (see FIG. 1) determining a first fingertip location including a first proximity of the fingertip to touch screen 116 (see FIG. 1) and a first position of the fingertip. The first position of the fingertip is the coordinate point on the surface of touch screen 116 (see FIG. 1) that is directly aligned with a central point of the fingertip.

In one embodiment, prior to step 206 and based on the first fingertip location determined in step 204, key size modification program 114 (see FIG. 1) determines the target key on keyboard 118 (see FIG. 1), by determining that the center of the target key is closer to the first fingertip location than the centers of all other keys included in keyboard 118 (see FIG. 1).

In step 206, based on the first proximity of the fingertip from the target key or touch screen 116 (see FIG. 1), key size modification program 114 (see FIG. 1) determines a first enlargement amount for the target key.

In step 208, based on the first proximity of the fingertip from the target key or touch screen 116 (see FIG. 1), key size modification program 114 (see FIG. 1) determines reduction amount(s) for corresponding key(s) (i.e., adjacent keys) included in keyboard 118 (see FIG. 1) that are adjacent to the target key.

In step 210, key size modification program 114 (see FIG. 1) slightly enlarges the size of the target key by the first enlargement amount determined in step 206 to indicate that the target key and not any other key will be enlarged further as the user's fingertip moves closer to the target key on touch screen 116 (see FIG. 1).

In step 212, key size modification program 114 (see FIG. 1) reduces the size(s) of the adjacent key(s) in displayed keyboard 118 (see FIG. 1) by the corresponding reduction amount(s) determined in step 208.

In another embodiment, steps 208 and 212 are optional, so that step 208 and step 212 may be eliminated so that no keys on keyboard 118 (see FIG. 1) are reduced in size, step 210 directly follows step 206, and step 214 (see FIG. 2B) directly follows step 210.

Step 214 in FIG. 2B follows step 212. In step 214, responsive to the fingertip moving closer to the target key, key size modification program 114 (see FIG. 1) determines a second, closer proximity of the fingertip to the target key or touch screen 116 (see FIG. 1). In one embodiment, step 214 includes key size modification program 114 (see FIG. 1) determining a second fingertip location that includes a second proximity of the fingertip to touch screen 116 (see FIG. 1). The difference between the second proximity and the first proximity of the fingertip from the target key or touch screen 116 (see FIG. 1) (i.e., the second proximity being less than the first proximity) indicates that the fingertip has moved closer to the target key and touch screen 116 (see FIG. 1). In one embodiment, a difference between the second fingertip location determined in step 214 and the first fingertip location determined in step 204 (see FIG. 2A) indicates that the fingertip has moved closer to the target key and touch screen 116 (see FIG. 1).

In step 216, based on the second proximity of the fingertip from the target key or touch screen 116 (see FIG. 1), key size modification program 114 (see FIG. 1) determines a second enlargement amount for the target key.

In step 218, based on the second proximity to touch screen 116 (see FIG. 1), key size modification program 114 (see FIG. 1) determines second reduction amount(s) for the corresponding adjacent key(s) included in keyboard 118 (see FIG. 1).

In step 220, key size modification program 114 (see FIG. 1) further enlarges the size of the target key based on the second enlargement amount determined in step 216. The further enlargement in step 220 helps the user to touch the target key and to avoid inadvertently touching another key adjacent to the target key as the user moves the user's fingertip to touch the target key on touch screen 116 (see FIG. 1).

In step 222, key size modification program 114 (see FIG. 1) reduces the size(s) of the adjacent key(s) in the displayed keyboard 118 (see FIG. 1) by the corresponding second reduction amount(s) determined in step 218.

In another embodiment, steps 218 and 222 are optional, so that step 218 and step 222 may be eliminated so that no keys on keyboard 118 (see FIG. 1) are reduced in size, step 220 directly follows step 216, and step 224 directly follows step 220.

In step 224, key size modification program 114 (see FIG. 1) receives an indication that the user touched the target key on touch screen 116 (see FIG. 1), where the target key being touched was displayed at a size that had been further enlarged in step 220.

The process of FIGS. 2A-2B ends at step 226.

In one embodiment, subsequent to step 212 (see FIG. 2A) and prior to step 214, key size modification program 114 (see FIG. 1) determines a sequence of proximities of the fingertip to touch screen 114 (see FIG. 1). The sequence of proximities indicates that the fingertip moves closer to touch screen 114 (see FIG. 1) between the aforementioned first and second proximities. Subsequent to determining the sequence of proximities, key size modification program 114 (see FIG. 1) displays the target key in a gradual progression of enlargements of the size of the target key, where the gradual progression of enlargements is based on the sequence of proximities.

In one embodiment, prior to step 204 (see FIG. 2A), key size modification program 114 (see FIG. 1) initiates display of the keyboard as covering a first surface area of touch screen 116 (see FIG. 1). Based on the aforementioned first proximity, key size modification program 114 (see FIG. 1) reduces sizes of a plurality of other, adjacent keys included in keyboard 118 (see FIG. 1). Subsequent to step 210 (see FIG. 2A) and subsequent to reducing the sizes of the plurality of other, adjacent keys, key size modification program 114 (see FIG. 1) initiates display of keyboard 118 (see FIG. 1) as including the enlarged key resulting from step 210 and the reduced plurality of other, adjacent keys in a second surface area that is substantially equal to the first surface area. In one embodiment, the display of keyboard 118 (see FIG. 1) in the second surface area is analogous to a display generated by a fisheye lens that distorts an image using an orthographic projection.

In one embodiment, prior to step 204, key size modification program 114 (see FIG. 1) initiates display of keyboard 118 (see FIG. 1) as covering a first surface area of touch screen 116 (see FIG. 1), and including the target key at an original size that is smaller than the aforementioned enlarged size. Based on the aforementioned first proximity and prior to step 214, key size modification program 114 (see FIG. 1) determines one or more keys included in keyboard 118 (see FIG. 1) to be moved on touch screen 116 (see FIG. 1) until the one or more keys are removed from the display of keyboard 118 (see FIG. 1). Based on the first proximity, key size modification program 114 (see FIG. 1) moves the one or more keys on touch screen 116 (see FIG. 1) towards one or more edges of the first surface area, without reducing their sizes. The movement of the one or more keys towards the edge(s) continues until the one or more keys move off of the first surface area and become removed from view on touch screen 116 (see FIG. 1). Subsequent to step 210 (see FIG. 2A) and the aforementioned moving of the one or more keys, key size modification program 114 (see FIG. 1) displays a modified keyboard 118 (see FIG. 1) as covering a second surface area that is substantially equal to the first surface area, and including the enlarged target key resulting from step 210 (see FIG. 2A), but not including the one or more keys that were removed from view. After displaying modified keyboard 118 (see FIG. 1), key size modification program 114 (see FIG. 1) receives an indication that the fingertip is at a distance from touch screen 116 (see FIG. 1) that exceeds a threshold distance. Responsive to the fingertip being at a distance exceeding the threshold distance, key size modification program 114 (see FIG. 1) displays keyboard 118 (see FIG. 1) as once again including the one or more keys and also including the target key at its original size, rather than its enlarged size.

Figure 3A:
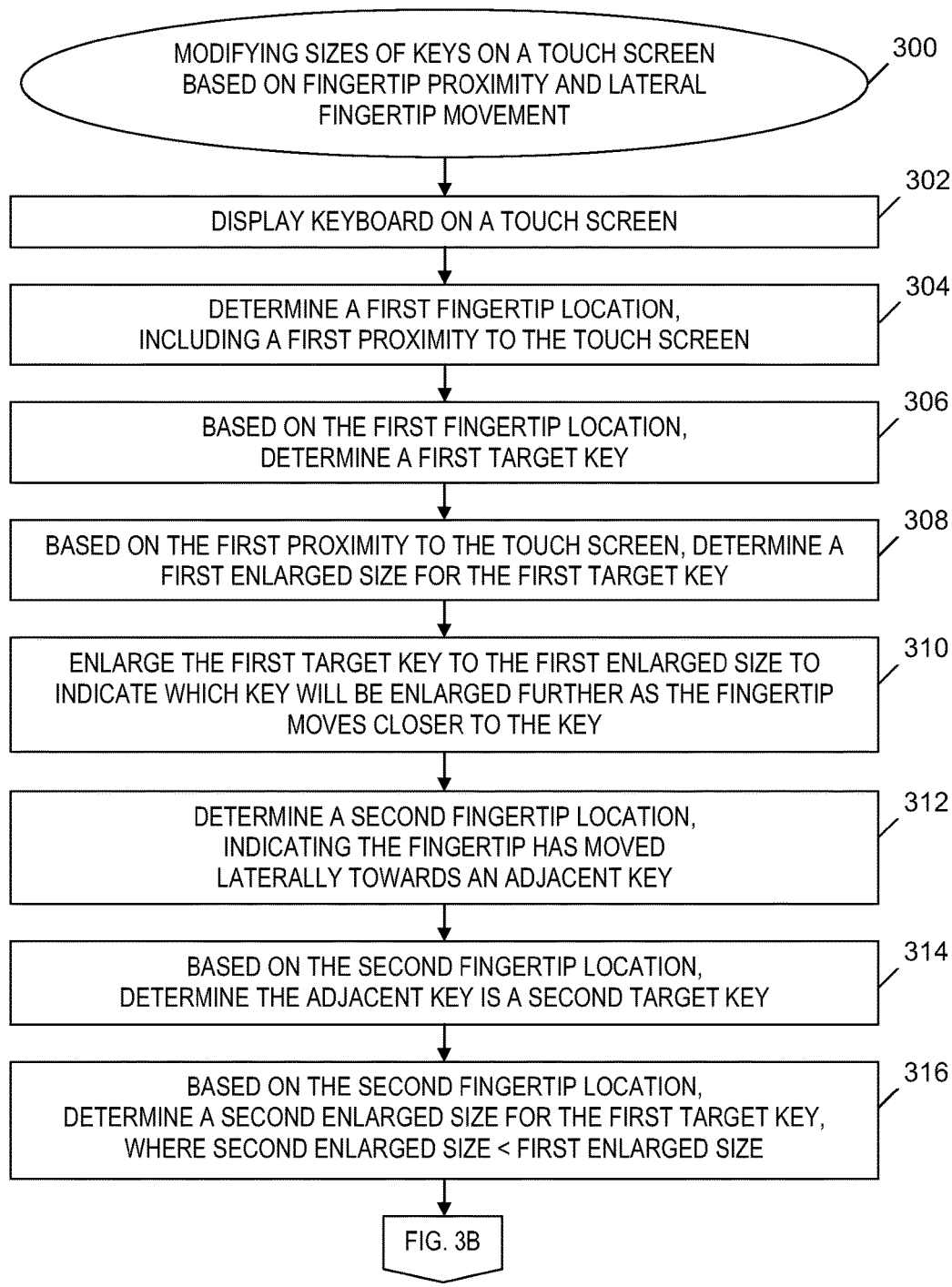
FIGS. 3A-3C depicts a flowchart of a key size modification program executed in a computer system included in the system of FIG. 1 to modify sizes of keys on a touch screen based on fingertip proximity to the touch screen and lateral fingertip movement, in accordance with embodiments of the present invention.
Figure 3B:
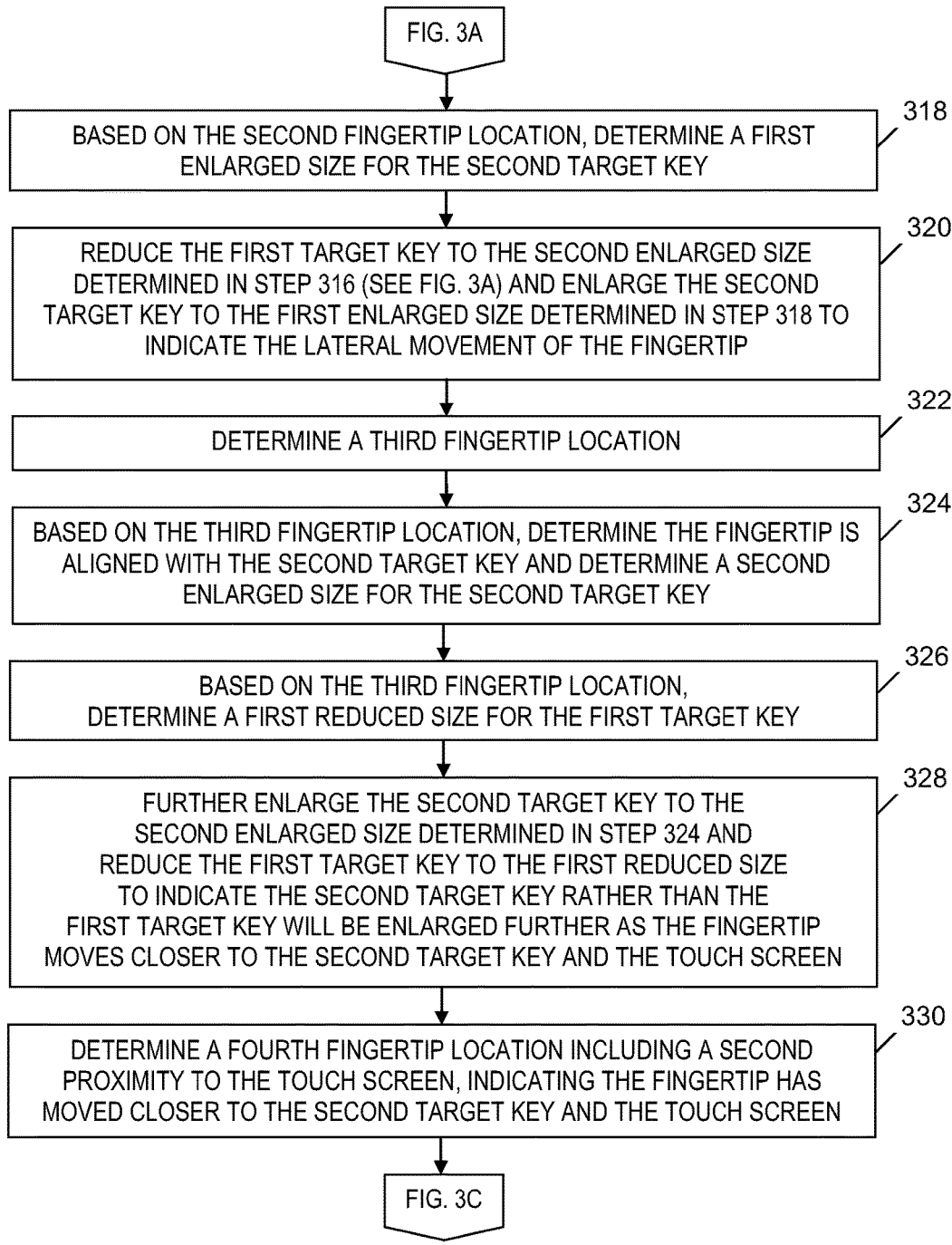
Figure 3C:
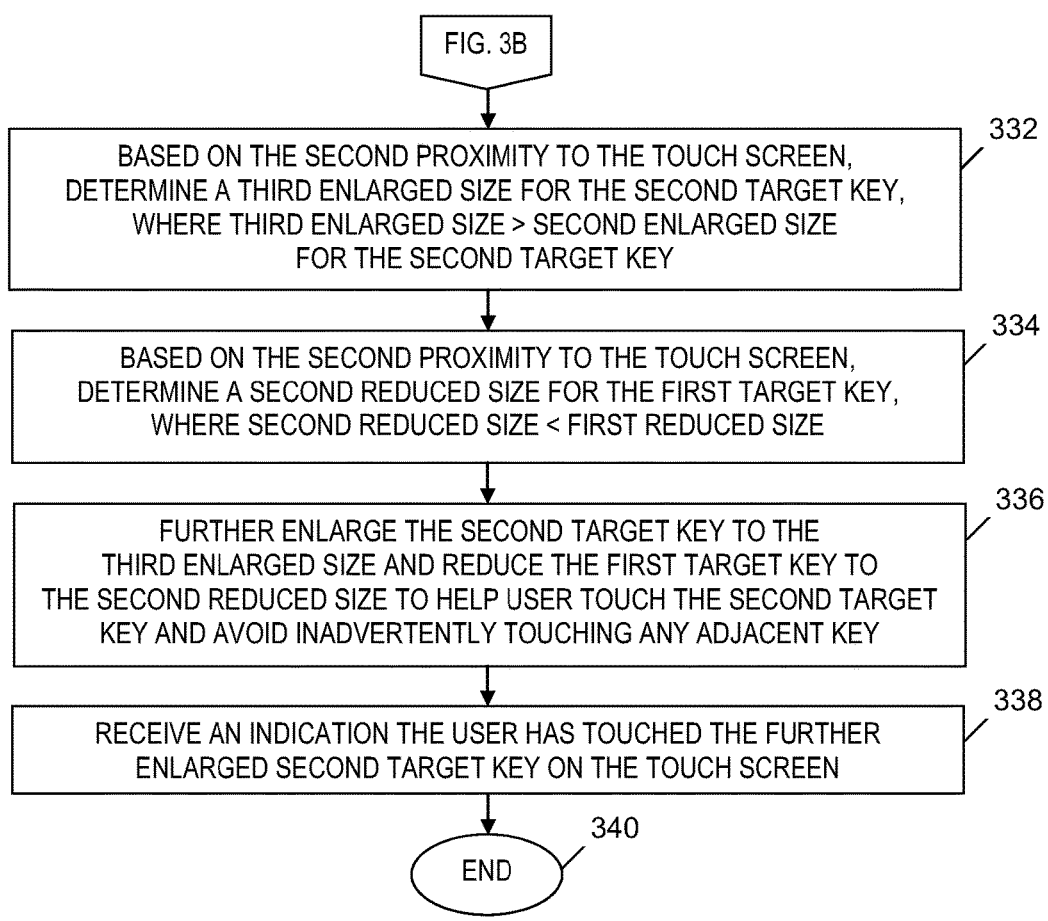

FIGS. 3A-3C depicts a flowchart of a key size modification program executed in a computer system included in the system of FIG. 1 to modify sizes of keys on a touch screen based on fingertip proximity to the touch screen and lateral fingertip movement, in accordance with embodiments of the present invention. The process of FIGS. 3A-3C begins at step 300. In step 302, key size modification program 114 (see FIG. 1) initiates a display of keyboard 118 (see FIG. 1) on touch screen 116 (see FIG. 1).

In step 304, key size modification program 114 (see FIG. 1) determines a first fingertip location including a first proximity of the fingertip to touch screen 116 (see FIG. 1) and a first position of the fingertip. The first position of the fingertip is the coordinate point on the surface of touch screen 116 (see FIG. 1) that is directly aligned with a point of the fingertip. In one embodiment, the point aligned with the coordinate point on the surface of touch screen 116 (see FIG. 1) is a central point of the fingertip.

In step 306, based on the first fingertip location determined in step 304, key size modification program 114 (see FIG. 1) determines a first target key on keyboard 118 (see FIG. 1), by determining that the center of the target key is closer to the first fingertip location than the centers of all other keys included in keyboard 118 (see FIG. 1).

In step 308, based on the first proximity to touch screen 116 (see FIG. 1) included in the first fingertip location determined in step 304, key size modification program 114 (see FIG. 1) determines a first enlarged size for the first target key.

In step 310, key size modification program 114 (see FIG. 1) enlarges the size of the first target key to the first enlarged size determined in step 308. The enlargement in step 310 indicates that the first target key and not any other key will be enlarged further as the user's fingertip moves closer to the first target key on touch screen 116 (see FIG. 1).

In step 312, key size modification program 114 (see FIG. 1) determines a second fingertip location indicating another coordinate point on the surface of touch screen 116 (see FIG. 1) that is directly aligned with (e.g., under) the central point of the fingertip at the second fingertip location. Because the fingertip has moved from the first fingertip location to the second fingertip location, the second fingertip location indicates that the fingertip has moved substantially laterally towards an adjacent key (i.e., another key on keyboard 118 (see FIG. 1) that is adjacent to the first target key, without the fingertip coming into contact with touch screen 116 (see FIG. 1).

In step 314, key size modification program 114 (see FIG. 1) determines that the second fingertip location is within a threshold distance from the center of the adjacent key, and based on the second fingertip location being within the threshold distance, key size modification program 114 (see FIG. 1) determines the adjacent key is a second target key.

In step 316, based on the second fingertip location, key size modification program 114 (see FIG. 1) determines a second enlarged size for the first target key, where the second enlarged size for the first target key is less than the first enlarged size for the first target key, as determined in step 308.

Step 318 in FIG. 3B follows step 316. In step 318, based on the second fingertip location, key size modification program 114 (see FIG. 1) determines a first enlarged size for the second target key.

In step 320, key size modification program 114 (see FIG. 1) reduces the first target key to the second enlarged size determined in step 316 (see FIG. 3A) and enlarges the second target key to the first enlarged size for the second target key determined in step 318 to indicate the aforementioned lateral movement of the fingertip.

In step 322, key size modification program 114 (see FIG. 1) determines a third fingertip location indicating yet another coordinate point on the surface of touch screen 116 (see FIG. 1) that is directly aligned with (e.g., under) the central point of the fingertip at the third fingertip location. Because the fingertip has moved from the second fingertip location to the third fingertip location, the third fingertip location indicates that the fingertip has again moved laterally towards, and closer to, the aforementioned adjacent key, without the fingertip coming into contact with touch screen 116 (see FIG. 1).

In step 324, based on the third fingertip location determined in step 322, key size modification program 114 (see FIG. 1) determines the fingertip is aligned with the second target key and determines a second enlarged size for the second target key.

In step 326, based on the third fingertip location, key size modification program 114 (see FIG. 1) determines a first reduced size for the first target key.

In step 328, key size modification program 114 (see FIG. 1) further enlarges the second target key to the second enlarged size determined in step 324, and reduces the first target key to the first reduced size determined in step 326 to indicate the second target key rather than the first target key or any other key on keyboard 118 (see FIG. 1) will be enlarged further as the fingertip moves closer to the second target key and touch screen 116 (see FIG. 1).

In step 330, key size modification program 114 (see FIG. 1) determines a fourth fingertip location that includes a second proximity of the fingertip to touch screen 116 (see FIG. 1). The difference between the fourth fingertip location and the third fingertip location determined in step 322 indicates that the fingertip has moved closer to the second target key and touch screen 116 (see FIG. 1).

Step 332 in FIG. 3C follows step 330. In step 332, based on the second proximity to touch screen 116 (see FIG. 1) included in the fourth fingertip location determined in step 330, key size modification program 114 (see FIG. 1) determines a third enlarged size for the second target key, where the third enlarged size is greater than that the second enlarged size for the second target key determined in step 324 (see FIG. 3B).

In step 334, based on the second proximity to touch screen 116 (see FIG. 1) included in the fourth fingertip location determined in step 330 (see FIG. 3B), key size modification program 114 (see FIG. 1) determines a second reduced size for the first target key, where the second reduced size is less than the first reduced size determined in step 326 (see FIG. 3B).

In step 336, key size modification program 114 (see FIG. 1) further enlarges second target key to the third enlarged size and reduces the first target key to the second reduced size to help the user to touch the second target key and to avoid inadvertently touching another key adjacent to the second target key as the user moves the user's fingertip to touch the second target key on touch screen 116 (see FIG. 1).

In step 338, key size modification program 114 (see FIG. 1) receives an indication that the user touched the second target key on touch screen 116 (see FIG. 1), where the second target key had been further enlarged to the third enlarged size in step 336.

The process of FIGS. 3A-3C ends at step 340.

EXAMPLES

FIGS. 4A-4C depict three views of an example of a modification in a size of a key on a touch screen resulting from a fingertip moving closer to the key on a touch screen and from the process in the flowchart depicted in FIGS. 2A-2B, in accordance with embodiments of the present invention. In FIG. 4A, a first view 400-1 of touch screen 116 (see FIG. 1) includes a portion of keyboard 118 (see FIG. 1) and a user's fingertip 402 whose location is determined in step 204 (see FIG. 2A). The location of fingertip 402 is determined to be relatively far away from touch screen 116 (see FIG. 1), but within a threshold distance. The portion of keyboard 118 (see FIG. 1) is displayed in step 202 (see FIG. 2A). First view 400-1 further includes a key 404 (i.e., the letter "D" key) in keyboard 118 (see FIG. 1) that is determined to be the target key. Key 404 is enlarged by a first enlargement amount in step 210 (see FIG. 2A), where the enlargement amount is determined in step 206 (see FIG. 2A). View 400-1 depicts key 404 as being slightly enlarged compared to keys at their original sizes (i.e., the "Q", "W", "T", "Y", "A", "G", "H", "Z", "V" and "B" keys). Key 406 (i.e., the "C" key, also known as an adjacent key) is adjacent to the "D" key and slightly reduced in size in step 212 (see FIG. 2A) by a first reduction amount determined in step 208 (see FIG. 2A). View 400-1 depicts other keys adjacent to the "D" key as being reduced in step 212 (see FIG. 2A) by first reduction amounts determined in step 208 (see FIG. 2A). In addition to the "C" key, the other keys adjacent to the "D" key are the "E", "R", "S", "F" and "X" keys.

In FIG. 4B, a second view 400-2 of touch screen 116 (see FIG. 1) includes the aforementioned portion of keyboard 118 (see FIG. 1) and fingertip 402 whose second location is determined in step 214 (see FIG. 2B). The second location of fingertip 402 indicates that fingertip 402 has moved from a position far from touch screen 116 (see FIG. 1), as shown in view 400-1 (see FIG. 4A), to a position that is near touch screen 116 (see FIG. 1). Second view 400-2 also includes key 404, which is further enlarged in step 220 (see FIG. 2B) by a second enlargement amount determined in step 216 (see FIG. 2B). View 400-2 depicts key 404 as being further enlarged compared to key 404 in view 400-1 (see FIG. 4A). View 400-2 depicts keys at their original sizes (i.e., the "Q", "W", "T", "Y", "A", "G", "H", "Z", "V" and "B" keys). Key 406 is further reduced in size in step 222 (see FIG. 2B) by a second reduction amount determined in step 218 (see FIG. 2B). View 400-2 depicts other keys adjacent to the "D" key as being reduced in step 222 (see FIG. 2B) by second reduction amounts determined in step 218 (see FIG. 2B). In addition to the "C" key, the other keys adjacent to the "D" key are the "E", "R", "S", "F" and "X" keys.

In FIG. 4C, a third view 400-3 of touch screen 116 (see FIG. 1) includes the aforementioned portion of keyboard 118 (see FIG. 1) and fingertip 402 whose location is determined in a repeat of step 214 (see FIG. 2B). The location of fingertip 402 indicates that fingertip 402 has moved from a position near touch screen 116 (see FIG. 1), as shown in view 400-2 (see FIG. 4B), to a position that is almost touching touch screen 116 (see FIG. 1). Third view 400-3 further includes key 404, which is again further enlarged in a repeat of step 220 (see FIG. 2B) by an enlargement amount determined in a repeat of step 216 (see FIG. 2B). View 400-3 depicts key 404 as being again further enlarged compared to key 404 in view 400-2 (see FIG. 4B). View 400-3 depicts keys at their original sizes (i.e., the "Q", "T", "Y", "A", "G", "H", "Z", "V" and "B" keys). Key 406 is again further reduced in size in a repeat of step 222 (see FIG. 2B) by a reduction amount determined in a repeat of step 218 (see FIG. 2B). View 400-3 depicts other keys adjacent to the "D" key as being reduced in the repeat of step 222 (see FIG. 2B) by reduction amounts determined in the repeat of step 218 (see FIG. 2B). In addition to the "C" key, the other keys adjacent to the "D" key are the "W", "E", "R", "S", "F" and "X" keys. It should be noted that because the "D" key in view 400-3 has been enlarged to a size that is large enough to touch or overlap the "W" key at its original size, the "W" key is considered to be an adjacent key that is reduced in step 222 (see FIG. 2B). Therefore the "W" key is reduced in view 400-3 but is not reduced in view 400-2 (see FIG. 4B).

FIGS. 5A-5C depict three views of an example of a modification of sizes of keys on a touch screen resulting from a fingertip moving laterally across a touch screen and from the process in the flowchart depicted in FIGS. 3A-3C, in accordance with embodiments of the present invention. In FIG. 5A, a first view 500-1 of touch screen 116 (see FIG. 1) includes a portion of keyboard 118 (see FIG. 1) and a user's fingertip 502 whose location is determined in step 304 (see FIG. 3A). The location of fingertip 402 is determined to be near a key 504 (i.e., the "D" key) included in keyboard 118 (see FIG. 1). The portion of keyboard 118 (see FIG. 1) is displayed in step 302 (see FIG. 3A). Key 504 is determined to be the target key in step 306 (see FIG. 3A). Key 504 is enlarged to a first enlarged size in step 310 (see FIG. 3A), where the first enlarged size is determined in step 308 (see FIG. 3A). View 500-1 depicts key 504 as being slightly enlarged compared to keys at their original sizes (i.e., the "Q", "W", "T", "Y", "A", "G", "H", "Z", "V" and "B" keys). View 500-1 depicts keys adjacent to the "D" key as being reduced to reduced sizes. The keys adjacent to the "D" key are the "E", "R", "S", "F", "C" and "X" keys.

In FIG. 5B, a second view 500-2 of touch screen 116 (see FIG. 1) includes the aforementioned portion of keyboard 118 (see FIG. 1) and fingertip 502 whose second location is determined in step 312 (see FIG. 3A). The second location of fingertip 502 indicates that fingertip 502 has moved laterally across (e.g., over) touch screen 116 (see FIG. 1) from a position directly aligned with (e.g., over) key 504 towards another key 506 (i.e., the "F" key). Second view 500-2 includes key 504 reduced slightly in step 320 (see FIG. 3B) to a size determined in step 316 (see FIG. 3A) that is less than the size resulting from step 310 (see FIG. 3A), but that is still larger than an original size of key 504. Second view 500-2 also includes key 506 enlarged in step 320 (see FIG. 3B) to a first enlarged size determined in step 318 (see FIG. 3B). View 500-2 depicts keys at their original sizes (i.e., the "Q", "W", "Y", "A", "G", "H", "Z" and "B" keys). View 500-2 depicts keys adjacent to the "D" key and keys adjacent to the "F" key as being reduced to reduced sizes. The reduced keys adjacent to the "D" key and/or the "F" key are the "E", "R", "T", "S", "G", "X", "C" and "V" keys.

In FIG. 5C, a third view 500-3 of touch screen 116 (see FIG. 1) includes the aforementioned portion of keyboard 118 (see FIG. 1) and fingertip 502 whose location is determined in a repeat of step 312 (see FIG. 3A). The location of fingertip 502 indicates that fingertip 502 has continued to move laterally across (e.g., over) touch screen 116 (see FIG. 1) so that fingertip 502 is directly aligned with (e.g., over) a point that is midway between the centers of keys 504 and 506. Third view 500-3 includes key 504 reduced again in a repeat of step 320 (see FIG. 3B) to a size determined in step 316 (see FIG. 3A) that is less than the size resulting from the previous performance of step 320, but that is still larger than an original size of key 504. Third view 500-3 also includes key 506 further enlarged in the repeat of step 320 (see FIG. 3B) to another enlarged size determined in a repeat of step 318 (see FIG. 3B). View 500-3 depicts keys at their original sizes (i.e., the "Q", "W", "Y", "A", "G", "H", "Z" and "B" keys). View 500-3 depicts keys adjacent to the "D" key and keys adjacent to the "F" key as being reduced to reduced sizes (i.e., the "E", "R", "T", "S", "G", "X", "C" and "V" keys).

Computer System

In one embodiment, computer system 101 in FIG. 1 implements the process of FIGS. 2A-2B and the process of FIGS. 3A-3C. Computer system 101 generally comprises a central processing unit (CPU) 102, a memory 104, an input/output (I/O) interface 106, and a bus 108. Further, computer system 101 is coupled to I/O devices 110 and a computer data storage unit 112. CPU 102 performs computation and control functions of computer system 101, including executing instructions included in key size modification program 114 (also known as program code 114) to perform a method of modifying key size on a touch screen based on fingertip location and to perform a method of modifying sizes of keys on a touch screen based on fingertip proximity and lateral fingertip movement, where the instructions are executed by CPU 102 via memory 104. CPU 102 may comprise a single processing unit, or be distributed across one or more processing units in one or more locations (e.g., on a client and server).

Memory 104 may comprise any known computer-readable storage device, which is described below. In one embodiment, cache memory elements of memory 104 provide temporary storage of at least some program code (e.g., program code 114) in order to reduce the number of times code must be retrieved from bulk storage while instructions of the program code are carried out. Moreover, similar to CPU 102, memory 104 may reside at a single physical location, comprising one or more types of data storage, or be distributed across a plurality of physical systems in various forms. Further, memory 104 can include data distributed across, for example, a local area network (LAN) or a wide area network (WAN).

I/O interface 106 comprises any system for exchanging information to or from an external source. I/O devices 110 comprise any known type of external device, including a display device (e.g., monitor), keyboard, mouse, printer, speakers, handheld device, facsimile, etc. Bus 108 provides a communication link between each of the components in computer system 101, and may comprise any type of transmission link, including electrical, optical, wireless, etc.

I/O interface 106 also allows computer system 101 to store information (e.g., data or program instructions such as program code 114) on and retrieve the information from computer data storage unit 112 or another computer data storage unit (not shown). Computer data storage unit 112 may comprise any known computer-readable storage device, which is described below. For example, computer data storage unit 112 may be a non-volatile data storage device, such as a magnetic disk drive (i.e., hard disk drive) or an optical disc drive (e.g., a CD-ROM drive which receives a CD-ROM disk).

Memory 104 and/or storage unit 112 may store computer program code 114 that includes instructions that are executed by CPU 102 via memory 104 to modify key size on a touch screen based on fingertip location. In one embodiment, memory 104 and/or storage unit 112 stores program code 114 that includes instructions that are executed by CPU 102 via memory 104 to modify key size on a touch screen based on fingertip location. Although FIG. 1 depicts memory 104 as including program code 114, the present invention contemplates embodiments in which memory 104 does not include all of code 114 simultaneously, but instead at one time includes only a portion of code 114.

Further, memory 104 may include other systems not shown in FIG. 1, such as an operating system (e.g., a Linux® operating system) that runs on CPU 102 and provides control of various components within and/or connected to computer system 101.

Storage unit 112 and/or one or more other computer data storage units (not shown) that are coupled to computer system 101 may store a fingertip location determined by fingertip location determination system 120 (see FIG. 1) and sent to computer system 101.

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable storage devices (e.g., memory 104 and/or computer data storage unit 112) having computer-readable program code (e.g., program code 114) embodied or stored thereon.

Any combination of one or more computer-readable storage mediums (e.g., memory 104 and computer data storage unit 112) may be utilized. In one embodiment, the computer-readable storage medium is a computer-readable storage device or computer-readable storage apparatus. A computer-readable storage device may be, for example, an electronic, magnetic, optical, electromagnetic, disk storage, or semiconductor system, apparatus, device or any suitable combination of the foregoing. A non-exhaustive list of more specific examples of the computer-readable storage device includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage device is a tangible medium that can store a program (e.g., program 114) for use by or in connection with a system, apparatus, or device for executing instructions. However, the terms "computer-readable storage medium" and "computer-readable storage device" do not encompass a signal propagation medium, such as a copper cable, optical fiber or wireless transmission medium.

Program code (e.g., program code 114) may be transmitted using any appropriate medium, including but not limited to wireless, wireline, optical fiber cable, radio frequency (RF), etc., or any suitable combination of the foregoing.

Computer program code (e.g., program code 114) for carrying out operations for aspects of the present invention may be written in any combination of one or more programming languages, including an object oriented programming language such as Java ®, Smalltalk, C++ or the like and conventional procedural programming languages, such as the "C" programming language or similar programming languages. Java and all Java-based trademarks are trademarks or registered trademarks of Oracle and/or its affiliates. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 101 or another computer system (not shown) having components analogous to the components of computer system 101 included in FIG. 1. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to a flowchart illustration (e.g., FIGS. 2A-2B) and/or block diagrams of methods, apparatus (systems) (e.g., FIG. 1), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 114). These computer program instructions may be provided to one or more hardware processors (e.g., CPU 102) of a general purpose computer, special purpose computer, or other programmable data processing apparatus to produce a machine, such that the instructions, which are executed via the processor(s) of the computer or other programmable data processing apparatus, create means for implementing the functions/acts specified in the flowchart and/or block diagram block or blocks.

These computer program instructions may also be stored in a computer-readable device (e.g., memory 104 or computer data storage unit 112) that can direct a computer (e.g., computer system 101), other programmable data processing apparatus, or other devices to function in a particular manner, such that the instructions (e.g., instructions included in program code 114) stored in the computer-readable storage device produce an article of manufacture including instructions which implement the function/act specified in the flowchart and/or block diagram block or blocks.

The computer program instructions may also be loaded onto a computer (e.g., computer system 101), other programmable data processing apparatus, or other devices to cause a series of operational steps to be performed on the computer, other programmable apparatus, or other devices to produce a computer implemented process such that the instructions (e.g., instructions included in program code 114) which are executed on the computer, other programmable apparatus, or other devices provide processes for implementing the functions/acts specified in the flowchart and/or block diagram block or blocks.

The flowcharts in FIGS. 2A-2B and FIGS. 3A-3C, and the block diagram in FIG. 1 illustrate the architecture, functionality, and operation of possible implementations of systems, methods, and computer program products according to various embodiments of the present invention. In this regard, each block in the flowcharts or block diagram may represent a module, segment, or portion of code (e.g., program code 114), which comprises one or more executable instructions for implementing the specified logical function(s). It should also be noted that, in some alternative implementations, the functions noted in the block may occur out of the order noted in the figures. Two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of modifying a size of a key on a keyboard displayed on a touch screen, the method comprising the steps of:

based on a fingertip of a user being aligned with the key at a first proximity from the key or the touch screen and one or more keys being originally included on a periphery of a display of the keyboard which covers a first surface area of the touch screen, a computer enlarging the size of the key by a first enlargement amount and the computer moving the one or more keys on the touch screen, and in response to the step of moving, the computer removing the one or more keys from view on the touch screen so that the one or more keys are no longer included on the display of the keyboard; and subsequent to the step of enlarging the size of the key, the computer retaining original sizes of a plurality of keys which are other than the one or more keys, the computer moving each of the plurality of keys on the display of the keyboard towards a corresponding edge of the touch screen, and the computer displaying the keyboard after the one or more keys are removed so that the displayed keyboard includes the moved plurality of keys having the original sizes and the key having the enlarged size, does not include the removed one or more keys, and covers a second surface area that is equal to the first surface area.

2. The method of claim 1, further comprising the steps of:

subsequent to the step of enlarging the size of the key by the first enlargement amount and prior to a determination of a second, closer proximity of the fingertip from the key or the touch screen, the computer determining a sequence of proximities of the fingertip to the touch screen, the sequence of proximities indicating the fingertip moves closer to the touch screen between the first proximity and the second proximity; and the computer displaying the key in a gradual progression of enlargements of the size of the key based on the sequence of proximities.

3. The method of claim 1, further comprising the steps of responsive to the fingertip moving closer to the key, the computer determining a second, closer proximity of the fingertip to the key or the touch screen and further enlarging the enlarged size of the key by a second enlargement amount to assist the user in touching the key and avoiding touching another, adjacent key on the keyboard.

4. The method of claim 1, further comprising the step of based on the first proximity and prior to a determination of a second, closer proximity of the fingertip to the key or the touch screen, the computer determining the one or more keys that are originally included on the periphery of the display of the keyboard.

5. The method of claim 1, further comprising the steps of:

subsequent to the steps of removing the one or more keys, moving each of the plurality of keys, and displaying the keyboard, the computer receiving an indication that the fingertip is in a position that exceeds a threshold distance from the touch screen; and responsive to the fingertip being in the position that exceeds the threshold distance, the computer re-displaying the keyboard as including the one or more keys that had been removed and the key at an original size, which was the size of the key prior to the step of enlarging the size of the key.

6. A computer system for modifying a size of a key on a keyboard displayed on a touch screen, the computer system comprising:
a CPU;
a computer-readable memory;
a computer-readable storage device;
first program instructions to, based on a fingertip of a user being aligned with the key at a first proximity from the key or the touch screen and one or more keys being originally included on a periphery of a display of the keyboard which covers a first surface area of the touch screen, enlarge the size of the key by a first enlargement amount and move the one or more keys on the touch screen;
second program instructions to, in response to the first program instructions moving the one or more keys on the touch screen, remove the one or more keys from view on the touch screen so that the one or more keys are no longer included on the display of the keyboard; and
third program instructions to, subsequent to the first program instructions enlarging the size of the key, retain original sizes of a plurality of keys which are other than the one or more keys, move each of the plurality of keys on the display of the keyboard towards a corresponding edge of the touch screen, and display the keyboard after the one or more keys are removed so that the displayed keyboard includes the moved plurality of keys having the original sizes and the key having the enlarged size, does not include the removed one or more keys, and covers a second surface area that is equal to the first surface area,
wherein the first, second, and third program instructions are stored on the computer-readable storage device for execution by the CPU via the computer-readable memory.

7. The computer system of claim 6, further comprising:
fourth program instructions to, subsequent to enlarging the size of the key by the first enlargement amount by the first program instructions and prior to a determination of a second, closer proximity of the fingertip to the key or the touch screen, determine a sequence of proximities of the fingertip to the touch screen, the sequence of proximities indicating the fingertip moves closer to the touch screen between the first proximity and the second proximity; and
fifth program instructions to display the key in a gradual progression of enlargements of the size of the key based on the sequence of proximities,
wherein the fourth and fifth program instructions are stored on the computer-readable storage device for execution by the CPU via the computer-readable memory.

8. The computer system of claim 6, further comprising fourth program instructions to, responsive to the fingertip moving closer to the key, determine a second, closer proximity of the fingertip to the key or the touch screen and fifth program instructions to further enlarge the enlarged size of the key by a second enlargement amount to assist the user in touching the key and avoiding touching another, adjacent key on the keyboard,
wherein the fourth and fifth program instructions are stored on the computer-readable storage device for execution by the CPU via the computer-readable memory.

9. The computer system of claim 6, further comprising fourth program instructions to, based on the first proximity and prior to a determination of a second, closer proximity of the fingertip to the key or the touch screen, determine the one or more keys that are originally included on the periphery of the display of the keyboard,
wherein the fourth program instructions are stored on the computer-readable storage device for execution by the CPU via the computer-readable memory.

10. The computer system of claim 6, further comprising:
fourth program instructions to, subsequent to the second program instructions removing the one or more keys and the third program instructions moving each of the plurality of keys and displaying the keyboard, receive an indication that the fingertip is in a position that exceeds a threshold distance from the touch screen; and
fifth program instructions to, responsive to the fingertip being in the position that exceeds the threshold distance, re-display the keyboard as including the one or more keys that had been removed and the key at an original size, which was the size of the key prior to the step of enlarging the size of the key,
wherein the fourth and fifth program instructions are stored on the computer-readable storage device for execution by the CPU via the computer-readable memory.

11. A computer program product for modifying a size of a key on a keyboard displayed on a touch screen, the computer program product comprising:
computer-readable storage device(s); and
computer-readable program instructions stored on the computer-readable storage device(s), the computer-readable program instructions when executed by a CPU:
based on a fingertip of a user being aligned with the key at a first proximity from the key or the touch screen and one or more keys being originally included on a periphery of a display of the keyboard which covers a first surface area of the touch screen, enlarge the size of the key by a first enlargement amount and move the one or more keys on the touch screen, and in response to moving by the computer-readable program instructions, remove the one or more keys from view on the touch screen so that the one or more keys are no longer included on the display of the keyboard; and
subsequent to enlarging the size of the key by the computer-readable program instructions, retain original sizes of a plurality of keys which are other than the one or more keys, move each of the plurality of keys on the display of the keyboard towards a corresponding edge of the touch screen, and display the keyboard after the one or more keys are removed so that the displayed keyboard includes the moved plurality of keys having the original sizes and the key having the enlarged size, does not include the removed one or more keys, and covers a second surface area that is equal to the first surface area.

12. The computer program product of claim 11, wherein the computer-readable program instructions, when executed by the CPU:
subsequent to enlarging the size of the key by the first enlargement amount and prior to a determination of the second, closer proximity of the fingertip to the key or the touch screen, determine a sequence of proximities of the fingertip to the touch screen, the sequence of proximities indicating the fingertip moves closer to the touch screen between the first proximity and the second proximity; and display the key in a gradual progression of enlargements of the size of the key based on the sequence of proximities.

13. The computer program product of claim 11, wherein the computer-readable program instructions, when executed by the CPU:

responsive to the fingertip moving closer to the key, determine a second, closer proximity of the fingertip to the key or the touch screen and further enlarge the enlarged size of the key by a second enlargement amount to assist the user in touching the key and avoiding touching another, adjacent key on the keyboard.

14. The computer program product of claim 11, wherein the computer-readable program instructions, when executed by the CPU:

based on the first proximity and prior to a determination of a second, closer proximity of the fingertip to the key or the touch screen by the computer-readable program instructions, determine the one or more keys that are originally included on the periphery of the display of the keyboard.

15. The computer program product of claim 11, wherein the computer-readable program instructions, when executed by the CPU:

subsequent to removing the one or more keys, moving each of the plurality of keys, and displaying the keyboard by the computer-readable program instructions, receive an indication that the fingertip is in a position that exceeds a threshold distance from the touch screen; and responsive to the fingertip being in the position that exceeds the threshold distance, re-display the keyboard as including the one or more keys that had been removed and the key at an original size, which was the size of the key prior to the step of enlarging the size of the key.

* * * * *